Figure 13:
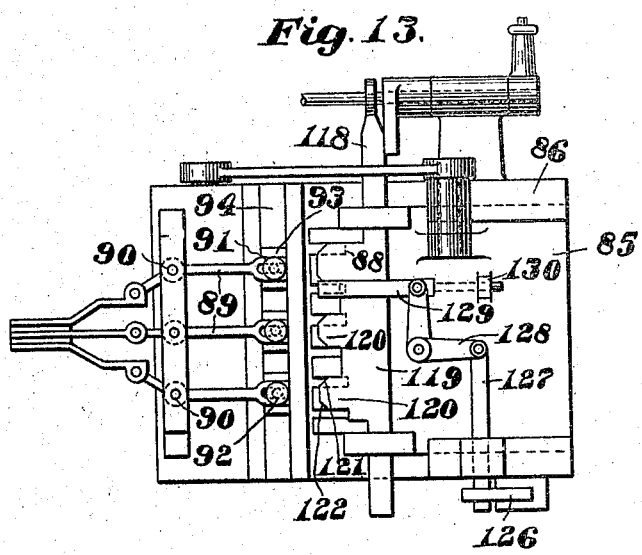

No. 885,022. PATENTED APR. 21, 1908.
H. H. CUMMINGS.
STITCH SEPARATING AND INDENTING MACHINE.
APPLICATION FILED JAN. 18, 1905.
6 SHEETS—SHEET 1.
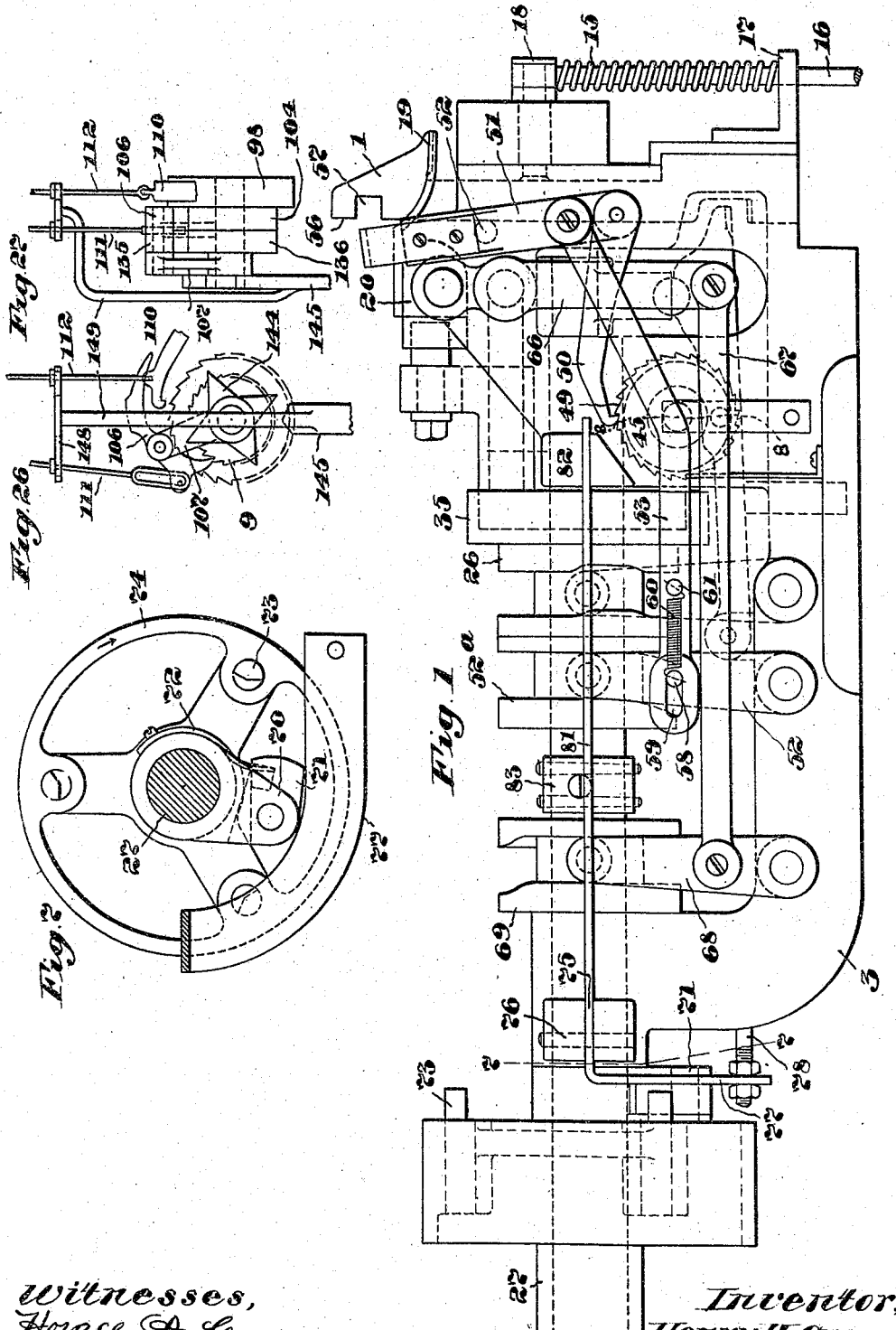
Witnesses,
Horace A. Crossman
Everitt S. Emery
Inventor,
Henry H. Cummings
by Emery Booth & Vanall
Attys.

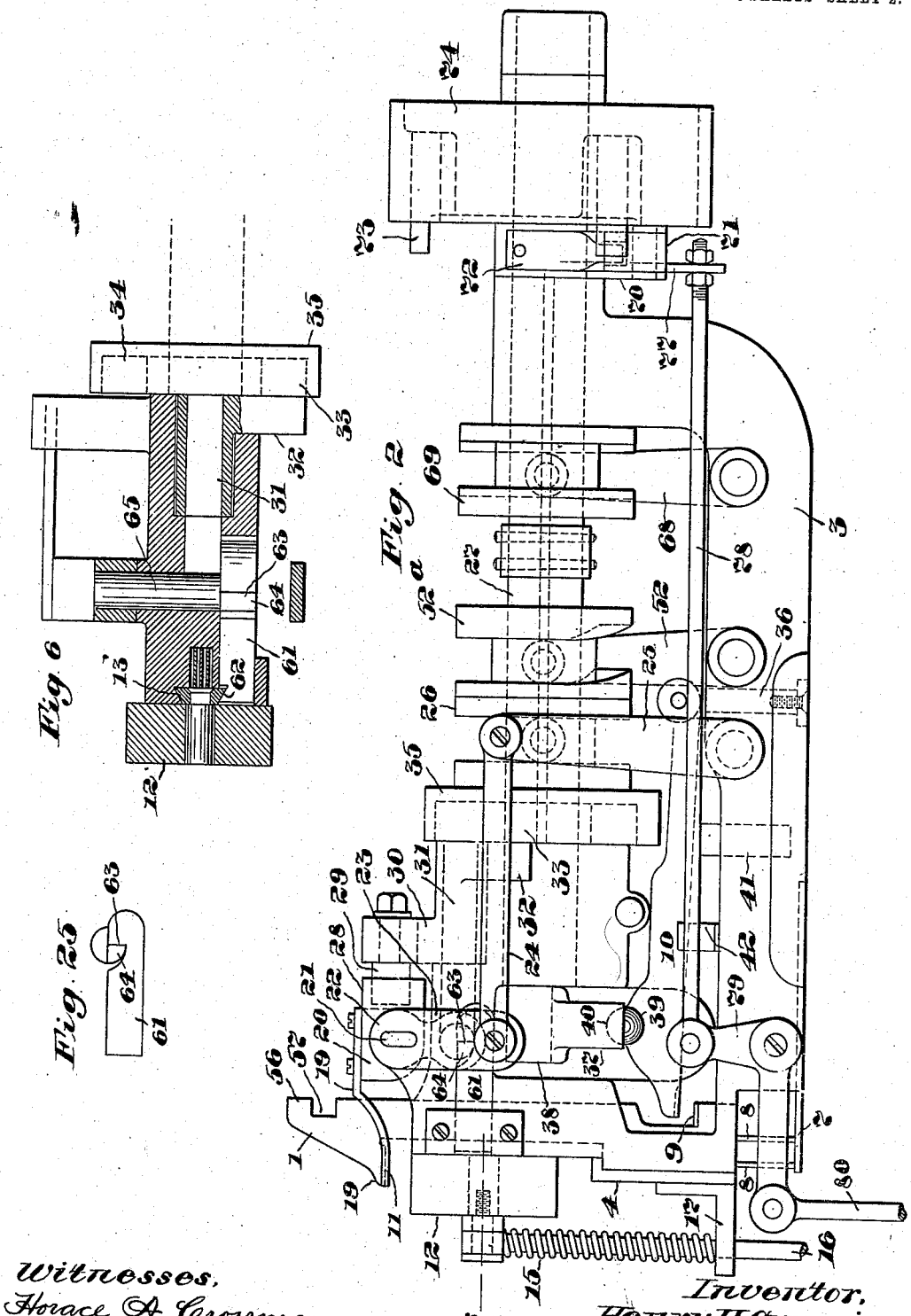

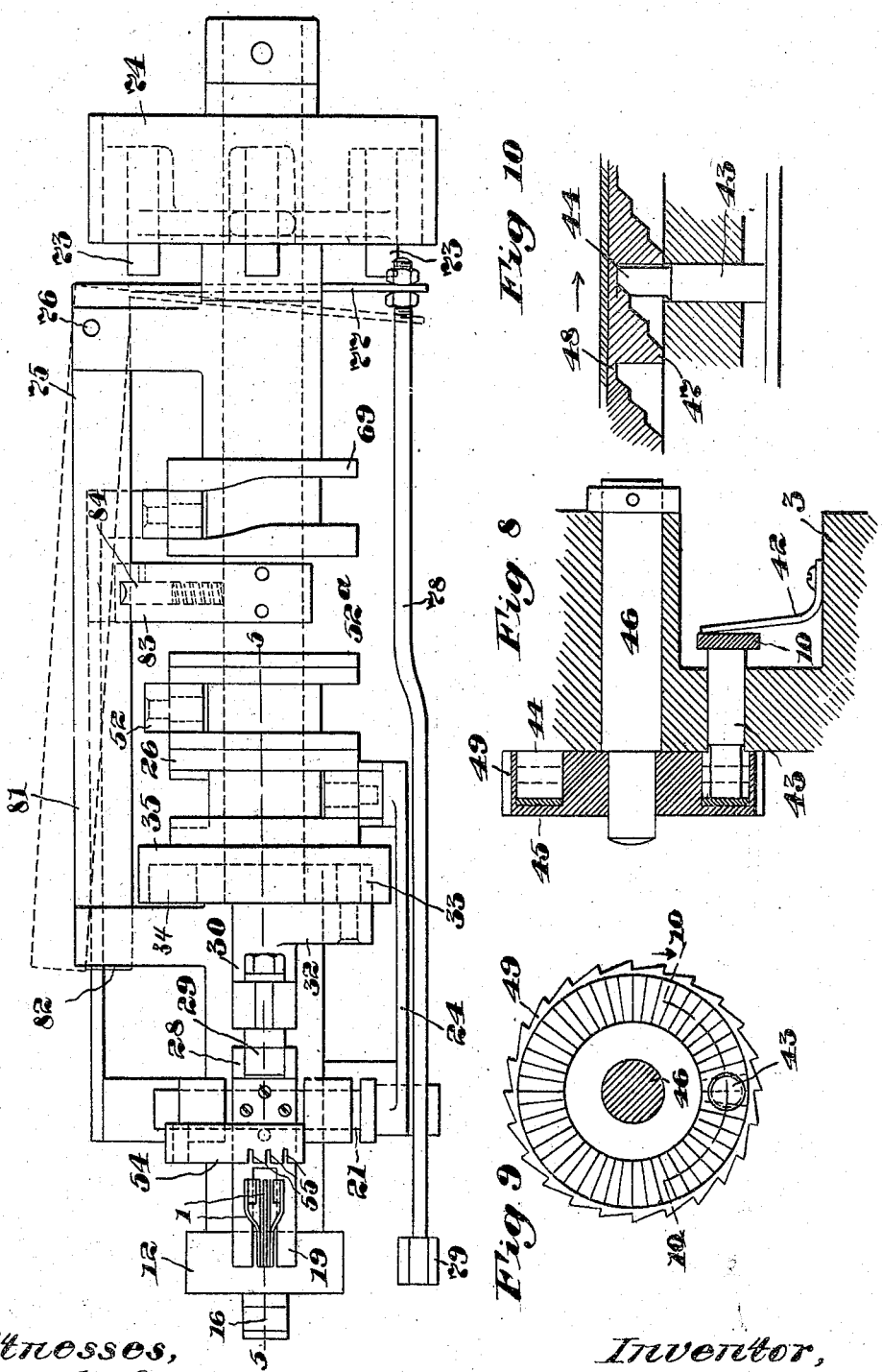

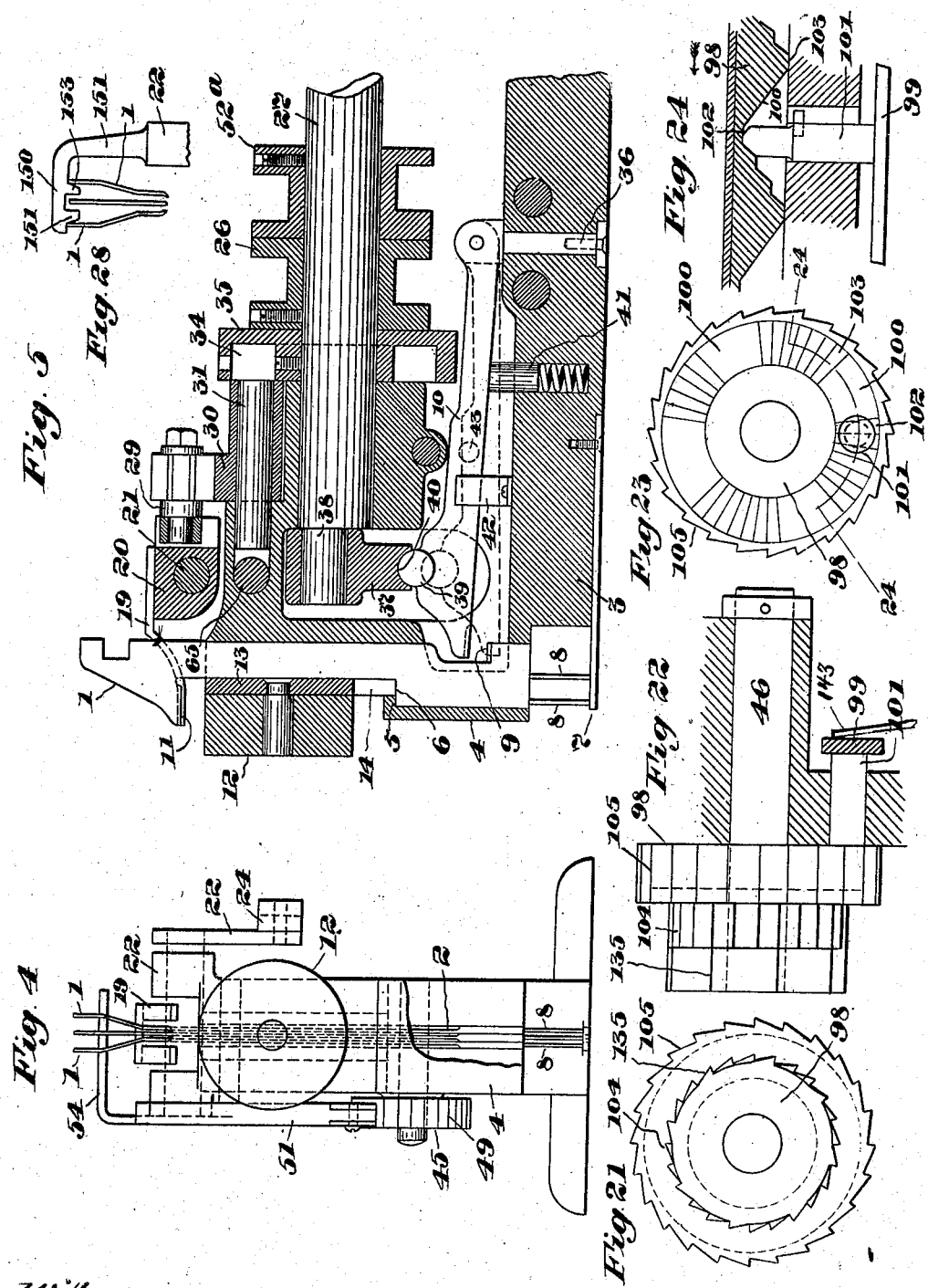

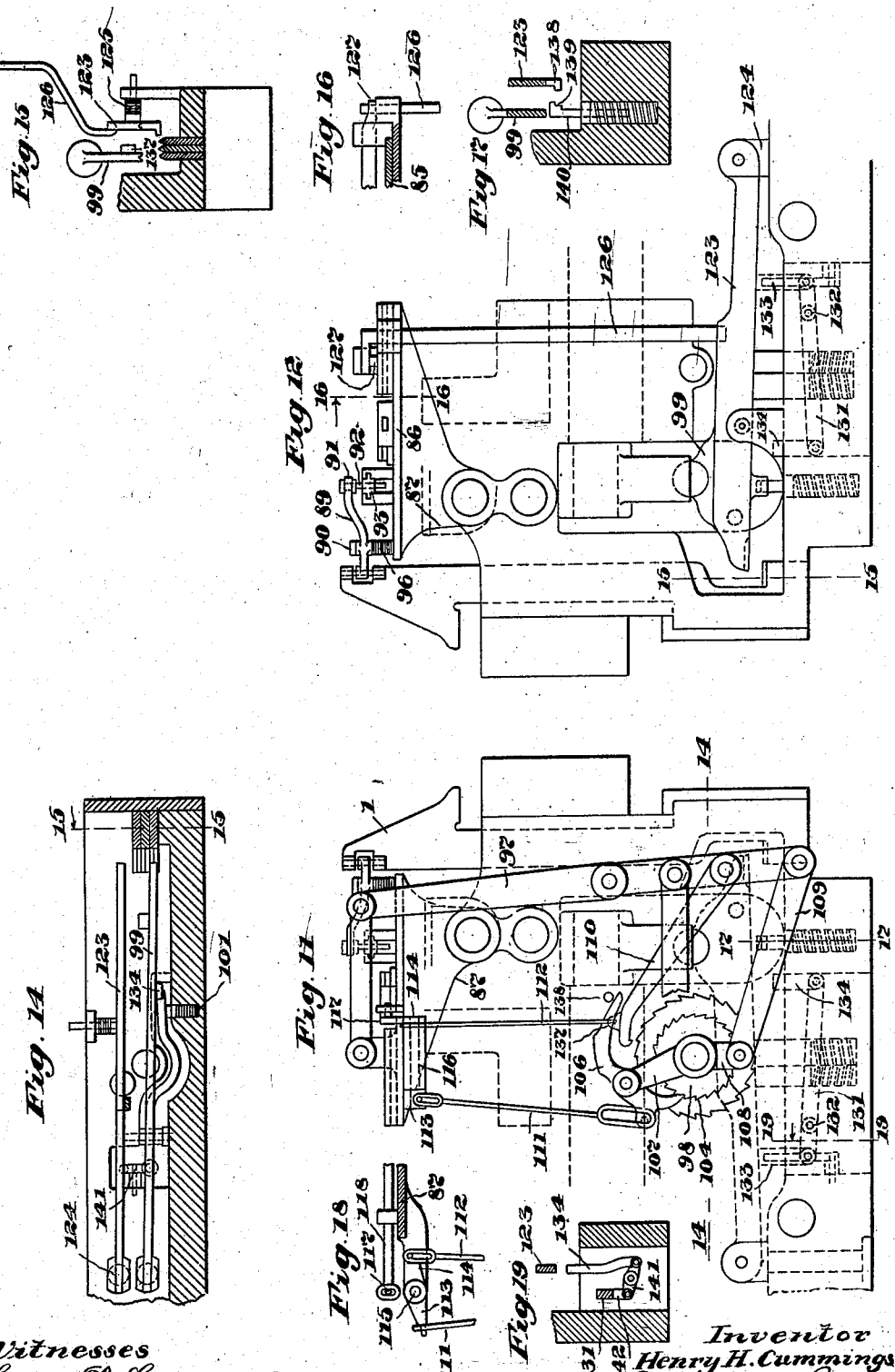

No. 885,022. PATENTED APR. 21, 1908.
H. H. CUMMINGS.
STITCH SEPARATING AND INDENTING MACHINE.
APPLICATION FILED JAN. 18, 1905.

6 SHEETS—SHEET 6.

Witnesses:
Horace H. Crossman
Emmett S. Cummings

Inventor:
Henry H. Cummings
by Emery & Booth
Attys.

UNITED STATES PATENT OFFICE.

HENRY H. CUMMINGS, OF MALDEN, MASSACHUSETTS, ASSIGNOR, BY MESNE ASSIGNMENTS, TO MANUFACTURERS MACHINE COMPANY, OF MONTCLAIR, NEW JERSEY, A CORPORATION OF NEW JERSEY.

STITCH SEPARATING AND INDENTING MACHINE.

No. 885,022.　　　Specification of Letters Patent.　　Patented April 21, 1908.

Application filed January 18, 1905. Serial No. 241,631.

*To all whom it may concern:*

Be it known that I, HENRY H. CUMMINGS, a citizen of the United States, residing at Malden, in the county of Middlesex, Commonwealth of Massachusetts, have invented an Improvement in Stitch Separating and Indenting Machines, of which the following description, in connection with the accompanying drawings, is a specification, like letters on the drawings representing like parts.

My invention relates generally to machines for separating and indenting stitches, and particularly the stitches which unite the welt and outer sole of a welt shoe. Machines of this character have long been known in the art and, as usually constructed, comprise devices for feeding the work step by step past a separating and indenting tool, which at each step of the feed is caused to enter the interval between successive stitches and distinctly separate one from the other by making an impression between them and across the welt.

When the lengths of the stitches correspond exactly to the length of the feed, the indenting tool will necessarily and without especial adjusting movement, accurately and uniformly find the intervals between the stitches. When, however, the lengths of the stitches vary in a given seam; or where seams differing one from another in the lengths of the stitches are to be indented, it is necessary to provide some means whereby the indenting tool may be caused automatically to find or locate the intervals where the indentations are to be made. This difficulty was early recognized in the art and has resulted in the adoption of several distinct constructions and modes of operation, which, however may be classified generally under two heads,—first, those in which the required adjustment is provided by lateral flexibility of the tool whereby upon striking the rounded shoulder of the stitch it may be deflected thereby from its normal direct path into the proper interval; and second, those in which the tool is swept or dragged positively over the crown of the stitch until it arrives at and drops into the interval between it and the next stitch.

Constructions of the first class have long been known in the sewing machine art where a laterally flexible or flexibly mounted indenting tool has been attached to a reciprocating part of the machine, such as the awl bar or the presser foot. A machine of this type is illustrated in the patent to Cobb, No. 421,095, Feb. 11, 1890. The feed of the work in this machine is uniform and the indenting tool is mounted upon one extremity of a flexible shank which extends along and is yieldingly attached at its opposite extremity to the awl bar of the machine. In actual practice the flexibility of the tool shank provides for the necessary lateral deflection of the tool from its normal path to "find" the interval to be indented. Where the variations in the stitches of a given seam were not too great, or where there was no cumulative error in the lengths of the stitches this construction proved itself perfectly efficient. Where, on the other hand any single stitch length or an accumulation of single stitch errors was sufficient to cause the tool to contact with the crown or center of the stitch, no deflection would take place and the tool would indent, and even cut, the stitch itself. To meet this difficulty the later or second type of machine above alluded to was devised. In this machine the tool is first brought lightly down upon the crown of the stitch and thereafter either the tool or the work is moved in the direction of the stitch line until the tool drops into and thereby "finds" the stitch interval whereupon the indenting operation takes place, and the feed is varied according to or as required by the cumulative error, otherwise the accumulation of error would shortly carry one or more of the stitch intervals beyond the range even of a tool of this sort. A machine of this type is illustrated in re-issue patent to Hadaway, No. 11,538, May 12, 1896. In this type of machine the indenting tool is pivotally mounted upon a carrier which causes the tool to move toward and from and also along the line of stitches. The tool is first caused to descend lightly upon the crown of a stitch, and is then given an initial movement along the stitch crown until it finds and drops into the interval at the end of that stitch crown. If the finding of the interval occurs before the completion of this initial stroke, the tool simply turns about its indenting end as a fulcrum during the remaining portion of said initial stroke and is then depressed to indent the interval. While still depressed the tool is given a further movement in continuation of the initial movement to the limit of its stroke, and carrying with it or feeding the work to bring a new stitch within the range of the indenting tool.

From the operation described it is obvious that the feed of the work will vary inversely to the length of travel of the tool before finding the interval, so that at the completion of each operation the stitch following the tool will be brought uniformly to the same starting position. Hence, owing to the comparatively wide range of finding movement of the tool and the variation of the feed according to the difference between the length of the stitch and the full stroke of the tool, this machine provides both for isolated and cumulative error. This construction, however, involves the use of complicated mechanism to impart the several movements to the indenting tool and moreover the sweeping of the tool along the crowns of the stitches is liable to abrade the seams.

My invention relates to the earlier and simpler Cobb type of having a uniform feed machine and comprehends means to provide for a larger range of operation, whether necessitated by isolated or accumulated discrepancies between the lengths of the stitches and the feed. Thus I eliminate the abrasion of the stitches that results from sweeping or dragging the indenting tool thereover.

To these ends the invention contemplates the employment of a plurality of flexible tools with means to permit and to cause that tool only to operate whose normal path of operation is nearest the interval to be indented, at any given period in the progress of the work. As soon as one tool is deflected to its limit, there is set in operation means automatically to cut in one of the other tools that is so located as to take the error where the previous tool left it and continue its work until it too reaches its limit of deflection when it cuts in another or the first tool, to resume the work.

My invention will be more clearly apparent from a description of one selected embodiment thereof, illustrated in the accompanying drawings, in which,—

Figure 29:
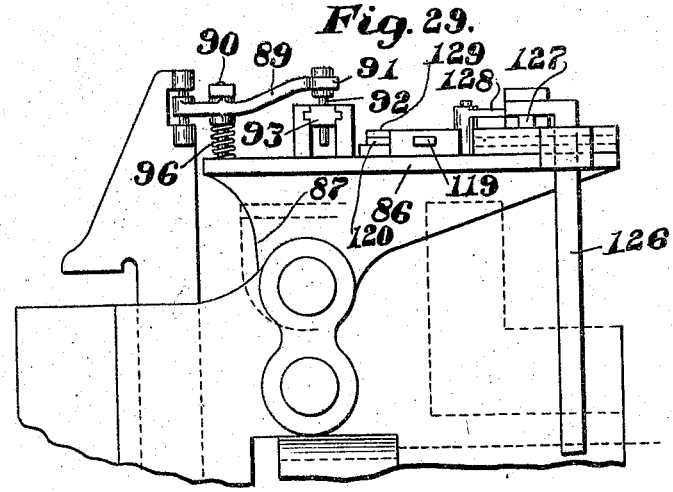
Figure 20:
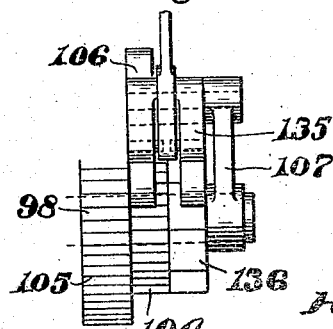

Figure 1 is a view in elevation of the left-hand side of one form of my stitch separating and indenting machine; Fig. 2 is a right-hand elevation thereof; Fig. 3 is a plan view; Fig. 4 is a front elevation; Fig. 5, a sectional view upon the line 5—5, Fig. 3; Fig. 6 is a horizontal section on the line 6—6, Fig. 2; Fig. 7 is a sectional view on the line 7—7, Fig. 1, looking to the left; Fig. 8 is a section on the line 8—8, Fig. 1, looking to the left; Fig. 9 is a face view of the cam disk; Fig. 10 is a section on the line 10—10—Fig. 9; Figs. 11 and 12 are left and right hand elevations, respectively, of a portion of my machine showing a modification; Fig. 13 is a plan view of the parts shown in Figs. 11 and 12; Fig. 14 is a section on the line 14—14, Fig. 11, some of the parts being omitted; Fig. 15 is a sectional view on the line 15—15, Fig. 12, looking to the rear; Fig. 16 is a section on the line 16—16, Fig. 12; Fig. 17 is a section on the line 17—17, Fig. 11, looking to the rear; Figs. 18, 19 and 20 are views of details hereinafter described; Figs. 21 to 23, inclusive, are detail views of a modified form of cam disk hereinafter described; Fig. 24 is a sectional view of the same on the line 24—24, Fig. 23; Fig. 25 is a detail view of the work support clamp; Figs. 26 and 27 are detail views of initial positioning mechanism for the cam disk; and Fig. 28 is a detail of a deflecting yoke for the outermost tools. Fig. 29 is an enlarged view in side elevation of the upper parts of the device shown by Fig. 12.

In the embodiment herein selected for illustration of my invention, the machine comprises a plurality of vertically reciprocating separating and indenting tools, 1, which, as shown in Figs. 4 and 5, may consist of thin, flexible, steel blades slidably mounted in a vertical guideway, 2, in the front end of the supporting frame, 3, said tools being securely held in place by a face plate, 4, having a rearward projection, 5, which contacts with steps or projections, 6, upon each blade to limit the upward movement thereof. The blades may be normally maintained in their extreme upper position, in any convenient manner, such as by plate springs, 7, secured at their rear extremities to the under side of the machine-frame and bearing at their forward extremities upon pins, 8, depending from the lower ends of the tools, 1. These tools are provided at their lower rear extremities with the contact points, 9, with each of which the vertically vibrating driver, 10, may engage at suitable intervals to depress the tools singly to perform the indenting operation.

Upon the front of the machine and beneath the working portions, 11, of the tools, is a rotary work support, 12, mounted upon a slide, 13, Figs. 5 and 6, arranged in a vertical guideway, 14, in the front face of the frame, said slide being normally held in its extreme upward position in any suitable manner, as by the spring, 15, surrounding a treadle rod, 16, and operating between the lug, 17, of the machine frame and the pintle, 18, of the work support.

Mounted to the rear and extending forward upon either side of the upper working extremities of the indenting tools, 1, is a forked presser-foot and feed bar, 19, which is carried by a block, 20, secured to the oscillating shaft, 21, journaled in ears, 22, of the machine-frame. The presser-foot, 19, may be oscillated in any suitable manner to clamp the work against the work support, 12, but as here shown in Fig. 2, the right-hand extremity of its oscillating shaft, 21, is rigidly secured to a depending arm, 23, connected by a link, 24, to the cam lever, 25, which is operated at suitable intervals by a cam, 26, on the main shaft, 27, of the machine, to rock the lever, 25, and thereby through the connections mentioned depress and elevate the presser-foot at required periods.

In order to provide for a feeding movement of the presser-foot, 19, the block, 20, upon which it is mounted is provided with ears, 28, which form a guide-way for a stud, 29, upon a rocking arm, 30, which (Figs. 2 and 6) is journaled on a fixed stud, 31, and is provided with a laterally extending arm, 32, having a cam roll, 33, engaging a suitable cam path, 34, of a rotary cam, 35, secured to the main shaft, 27. By means of the construction just described, the block, 20, is reciprocated laterally, the shaft, 21, to which it is secured sliding in its bearings, whereby after an indenting operation has been performed and the presser-foot is still depressed upon the work, the latter is given a lateral feeding movement to the left to position the work for the next operation.

In the operation of the parts thus far described, the work support, 12, is depressed against its spring by a suitable treadle and the work inserted between it and the presser-foot, 19, with the interval between the stitches substantially beneath the center tool, whereupon the work is clamped in position upon release of the treadle.

Upon starting the machine the presser-foot is depressed slightly by the rocking of its shaft, 21, and at the same time suitable means are brought into requisition to clamp or hold the work support, 12, in a fixed position. The center one of the tools, 1, then descends and its working blade enters the interval between successive stitches forming the required separation therebetween and simultaneously indenting the welt transversely in the usual manner. Upon the rising of the tool after the indenting operation the presser foot, 19, moves to the left, thus feeding the work one step.

If the length of the stitches is equal to the length of the feeding stroke, the next interval will also be brought directly within the normal path of the center tool, and the indenting operation will be repeated as before. If, however, there is a discrepancy between the length of the stitches and the feeding stroke, the next consecutive interval will, upon the feeding out of the indented interval, assume a position either to the right or left of the center tool according to whether the stitch to the left of the indented interval is longer or shorter than the feeding stroke. If the former is the case, the center indenting tool upon entering the interval will be deflected to the right. If the latter, it will be deflected to the left. The machine herein described is so adjusted as to feed the work always a distance less than the average length of the stitches operated upon. Consequently, as the work is fed, the position of the interval to be indented will be gradually shifted to the right; and when the center tool reaches the limit of its deflection to the right, the work of indenting the succeeding interval will thereafter be thrown by means hereinafter to be described upon the right-hand tool.

As the position of the interval continues to shift to the right, it is obvious that it will in time reach the limit of right hand deflection of the right hand tool, and if the operation of this tool were continued, it would upon its next stroke fail to enter the succeeding interval and would strike upon and abrade or cut the stitch. In order to avoid this defect, it is desirable that the interval last indented upon the extreme right of the range of the tools be fed to the left and entirely out of the range of the tools, and the succeeding interval be fed within the range of the tools. If an interval has been indented by an extreme right hand stroke of the right hand tool, the next step of the feed will obviously feed said interval to a position beneath the left hand tool. If, now, this tool be caused to operate, the same interval will be indented a second time. As one means to avoid this contingency it is desirable to give the work a second feeding movement to bring the next succeeding interval within range. In order to accomplish this result, means are provided whereby after the last or extreme right hand stroke of the right hand tool the work is given two successive feeding strokes before an indenting tool is again brought into operation. Under these conditions it is obvious that the next interval to be indented will be brought to a position within range of substantially the extreme left hand stroke of the left hand tool; whereupon, the operation of indenting will continue uninterruptedly through the operation of this tool until the latter reaches the extreme of its right hand deflection; whereupon the work of indenting may be shifted upon the center tool and thereafter upon the right hand tool until the latter has reached the right hand limit of its deflection, as before.

In order to provide for the necessary sequence of operations of the three indenting tools, means are provided for shifting the path of operation of the driver 10 from one to another of the tools. To this end, said driver 10 is pivoted upon a vertical post 36 journaled in the bed of the machine as shown in Fig. 2, whereby it may be swung laterally to a position over any one of the three contact points 9, as desired. The driver 10 is operated by means of the pitman 37 mounted upon a wrist pin 38 projecting from the forward extremity of the shaft 27 (see Fig. 2) and in order to accommodate the lateral shifting of the driver 10, the latter is engaged with said pitman by a ball and socket joint 39, 40, these parts being held in engagement by the spring stud 41 located in the bed of the machine beneath the rear portion of the driver and pressing the same upwardly. By reference to Fig. 8, it will be seen that the driver 10 is normally forced to its extreme left hand position by means of a suitable spring, 42. In order to accomplish the shifting of the driver, a cam stud, 43, (see Figs. 8 and 10) is mounted at a convenient point in the machine frame, one end of which abuts against the driver, 10; and the opposite end is held by the spring, 42, in contact with cam faces of a step cam or rotary cam disk, 45, journaled upon a stud, 46. The contours of the cam surfaces in said step cam or cam disk 45, are clearly shown in Fig. 10; and upon moving the step cam or disk in the direction shown by the arrow in said figure, it is obvious that the stud, 43, will successively travel outward from the lowest or deepest step to the highest or outermost step, thereby shifting the driver, 10, step by step from left to right, as viewed in Fig. 8. When the stud, 43, contacts with the outermost cam face, 47, (Fig. 10), the driver, 10, will be held in operative position over the contact point, 9, of the right hand tool, 1. When, on the other hand, the stud, 43, rests upon the lowest step of the face, 48, of the step cam or cam disk, the driver will operate idly in the space immediately to the left of the left hand tool, the latter being the relative position of the parts when it is desired to provide for two feeds of the work between successive indenting operations as above described. The intermediate spaces of the cam face will position the tool for operation over the center and left hand tools respectively.

In order to provide the necessary rotation of the cam disk, 45, to bring the successive cam faces into operative position opposite the stud, 43, the periphery of the said disk is provided with the ratchet teeth, 49, engaged by the pawl, 50, pivoted on the lower extremity of the lever, 51, which in turn is pivoted at 52, on the side of the machine frame (see Fig. 1) and operated through the link, 53, from cam lever, 52$^b$, actuated by the cam, 52$^a$. The upper extremity of the lever, 51, is provided with an arm, 54, (see Fig. 3), constituting a feeler which extends laterally across the machine at the rear of the upper extremities of the tools, 1. The arm, 54, as shown in Fig. 3, is provided with notches, 55, which are located respectively a little to the right of the upper extremities of the tools, 1; the outer tools being flared outwardly in order to provide sufficient range for the location of these notches.

During the operation of the machine, and while one of the tools, 1, is depressed in the indenting operation, the arm, 54, is swung forward; and if at this time an indenting tool is operating in its normal path undeflected, the forward edge of the arm, 54, will contact with the portion, 56, above the notch, 57, at the rear of the tool; whereby the stroke of the lever, 51, will be so limited that the pawl, 50, will not move sufficiently to engage a new ratchet tooth, 49, on the disk, 45. If however the tool operated is at the same time deflected by the stitches to the right sufficiently to permit a slot, 55, of the arm, 54, to engage the same, the lever, 51, will be permitted to oscillate a full stroke, whereby the pawl, 50, will engage a new ratchet tooth on the disk, 45, and upon the return stroke of the lever, said step cam or cam disk will be moved one step, thus shifting the lever, 10, from the tool last operated into position to actuate the next tool to the right.

In order to permit the cam lever, 52, which operates the link, 53, to make its full stroke, as it must each time, said lever is provided with a stud, 58, which engages a slot, 59, at the rear extremity of the link, 53, which stud is connected by a spring, 60, with a stud, 61, upon said link, 53; whereby when the lever, 51, is permitted only a partial stroke, due to contact with a depressed tool as described, the stud, 58, will move idly in the slot, 59.

Referring now to Figs. 3 and 10, it is clear that when the driver, 10, is actuating the right hand tool, 1, the stud, 43, is in engagement with the cam face, 47, of the step cam or cam disk; hence, when the right hand tool is deflected sufficiently to enter the right hand slot, 55, of the arm, 54, it is obvious that the next rotation of the step cam or cam disk, due to the return stroke of the lever, 51, will drop the stud, 43, into the deepest cam depression, 48, of the step cam or cam disk, 45, thus permitting the driver, 10, to swing to its extreme left hand position in which it will perform one idle stroke while the lever, 51, performs another full stroke and again rotates the cam disk to bring the next cam face into engagement with the stud, 43, whereby the driver, 10, is moved into operative position over the left hand tool, 1. This extra full stroke of the lever, 51, is possible owing to the fact that inasmuch as the driver makes one idle stroke, none of the tools are depressed and consequently the arm, 54, may enter the openings, 57, in the rear of the tools.

Bearing in mind that the uniform feed of the machine is adjusted so as always to be a trifle less than the shortest length of the stitches operated upon, it is clear that at this stage of the work the left hand tool will take up the indenting operation at the interval succeeding that last indented by the right hand tool, and, as the intervals gradually shift to the right, the indenting operation will be successively taken up by the center and right hand tools in the manner already described.

Referring again to the work support 12, the latter as previously stated is positively held in fixed position during the indenting operation in order to resist the pressure of the indenting blade. Any suitable means to this end may be employed, but as here shown in Figs. 2 and 6, a slide 61 is mounted horizontally in the side of the machine and provided with a beveled face 62 to engage the beveled side of the slide 13 upon which the work support 12 is mounted. This slide 61 at its rear end is provided with a shoulder 63 adapted to be engaged by a quadrant projection 64 (see Fig. 25) upon the extremity of the stud 65, whereby when said stud is oscillated to the left from the position shown in Fig. 2, the quadrant projection 64 will draw the slide 61 slightly to the rear and thus clamp the slide 13, and consequently the work support 12, in fixed position. Rotation is imparted to the stud 65 by means of an arm 66 (see Fig. 1) connected by a link 67 with the cam lever 68, which in turn is actuated by a cam 69 on the main shaft 27.

In order to start and stop the machine, suitable clutch mechanism may be provided, which as here shown comprises (see Fig. 7) an arm 70 secured to the main shaft 27, and to which is pivoted a clutch pawl 71 normally held outwardly by a spring 72 in the path of studs 73 located at suitable intervals upon the loose driving pulley 74 on the main shaft 27. A clutch lever 75 pivoted at 76 (see Fig. 1) upon the frame of the machine serves, through the downwardly and laterally extending portion 77 to hold the pawl 71 out of the path of the studs 73 and upon the driving pulley. Said lever may be held in such position in any suitable manner, but as here shown in Fig. 2 a rod 78 connects the same by means of a bell crank lever 79 with a treadle rod 80, which may be controlled by a spring or otherwise to hold the parts in the positions shown.

In order positively to stop the machine when the clutch is thrown out of operation, the clutch lever 75 (see Fig. 1) is provided with an extension 81, which, when the arm 77 lies in the path of the pawl 71, engages a notched lug 82 extending from the machine frame (see Figs. 1 and 3). This extension when in the position shown in full lines in Fig. 3, lies in the path of an arm 83 projecting from the shaft 27, and checks further rotation of the shaft 27. In order to avoid rebound of the arm 83, and consequent reverse movement of the main shaft, said arm is provided with a catch 84 which at the moment of contact between the arm and lever 81 snaps over the latter and holds the parts in positive engagement.

In the operation of the embodiment of my invention heretofore described it has been assumed that the average length of stitch is at all times greater than the feeding stroke of the work. Inasmuch, however, as the stitches in different pieces of work vary considerably in length, it is desirable where the feed is constant that means be provided for automatically finding the required interval whether the length of the stitches be greater or less than the range of the feed. To this end I have provided the instrumentalities hereinafter described. Instead of the rocking arm 54 provided with notches 55 referred to in the above described embodiment of my invention, a comb plate or feeler 85 is provided, which is slidably mounted in a guideway 86 formed in the upper surface of an extension 87 of the machine frame. Within the forward edge of the feeler 85 is provided the notches 88, corresponding to the notches 55 above described, but in this instance a pair of notches is provided for each tool, one upon either side of its normal central position, in order to provide for deflection of the tool in either direction.

In order to allow for the location of certain operating mechanism in conjunction with the comb 85, it is desirable that the notches 88 be spaced apart at a somewhat greater distance than heretofore described. To this end, the tools 1 have the levers 89 pivoted at their upper rear edges, which levers are in turn pivoted at 90 to the frame of the machine and are forked at their rear ends, as 91, to embrace the studs 92, which are slidably mounted in blocks 93 located in the guideway 94 within the plate 95 which spans the guide-way 86 substantially at its forward extremity, (Figs. 12 and 13). The levers 89 are normally held in elevated position by means of springs 96 surrounding their pivots and when in raised position they maintain the studs 92 above and entirely out of the path of the comb or feeler 85. When, however, any one of the tools is depressed the lever 89 attached thereto is depressed with it, whereby the corresponding stud 92 descends into the path of the comb or feeler 85 and if during an indenting operation the depressed tool is deflected laterally, such lateral movement is transmitted through the lever 89 to move its stud 92 in the opposite direction; and upon sufficient deflection, said tool will come within range of one of the slots 88, whereupon the lever 97 (Fig. 11) corresponding to the lever 51 above described is permitted to make a full stroke and thus operate a cam disk 98 (see Fig. 11) to shift the position of the driver 99 (Fig. 12) substantially in the manner hereinbefore described.

The mechanism for gradually shifting the position of the driver from a path over the left hand tool successively to the center and the right-hand tool respectively and return, as required when the length of stitch is greater than that of the length of the feed, has been hereinbefore described. When, however, the length of the stitch is less than that of the feed, the position of the interval to be indented will be gradually shifted to the left or in the direction of feed instead of to the right and at a rate proportionate to the discrepancy between the lengths of successive stitches and the length of the feed. Under these conditions it will be necessary to provide for the gradual shifting of the operating driver from right to left, as the position of the interval is shifted from beneath one tool to that to the left. This may be accomplished by modifying somewhat the construction and arrangement of the cam faces, and reversing the direction of rotation of the cam disk operating upon stud 43, hereinbefore described. Such construction is shown in Figs. 20, 21 and 22. In these figures, in addition to the cam surfaces or faces already provided, there is substituted for the abrupt drop to the face 48 on cam disk 45, Fig. 10, an inclined or beveled face 100 Fig. 24 on a cam disk 98 corresponding to 45 of a length equal to two ordinary cam steps, whereby the stud 101 corresponding to stud 43 may be shifted from the face 102 immediately to the face 103, in order that the driver 99 may be shifted immediately from the left-hand to the right-hand tool, as hereafter described.

In order to provide for the reverse rotation of the cam disk 98, the latter is provided with a second series of ratchet teeth 104 arranged oppositely to the teeth 105, the latter corresponding to the teeth 49 of the embodiment of the invention above described. These teeth 104, are engaged by a pawl 106, which is pivoted to a lever 107, mounted upon the same axis as the cam disk and having an extension 108, which is connected by a link 109, with the lower extremity of the lever 97; while the pawl 110, also pivoted to the lever 97, and nearer the pivot point thereof, serves to rotate the cam disk in normal or forward direction. It is to be understood that when one of the pawls, 106 or 110, is in engagement with the cam disk 98, the other is held out of engagement therewith, and to this end and also for the purpose of shifting the pawls into and out of operative position, their forward extremities are connected by means of the links 111 and 112, respectively, with rocking arms 113 and 114, mounted upon the rockshaft 115 (Fig. 18), journaled in the projection or hub 116 (Fig. 11), projecting from a convenient portion, as the extension 87, of the machine frame. To actuate the links 111 and 112, the rockshaft 115 has attached thereto an upwardly projecting arm 117 (see Fig. 18) which is engaged by an arm 118, projecting laterally from a switch 119, slidably mounted in any suitable manner upon the feeler or comb 85 (Fig. 13). This switch is provided with the beveled extensions 120, which, as shown in Fig. 13, are so arranged that when the beveled faces 121, upon one side thereof, each extend across a slot 88, in the comb or feeler, 85, the beveled faces, 122, upon the opposite sides of the same extensions, respectively, are each located to one side of the other slot 88 of the same pair or of that pair of slots which coöperates with a given one of the studs, 92. Hence it is clear that the switch 119 and consequently the pawls 106 and 110, will be shifted according to which one of a given pair of the slots 88 engages a stud 92 of one of the tools.

Referring now to the conditions which must be met when the stitch is of less length than the feed, it will be clear that the interval to be indented will gradually be shifted to the left until the left hand tool is deflected to the left to the limit of its range and consequently upon the next feeding movement the following interval will be fed entirely beyond the range of the indenting tools. In order to meet this condition it is necessary at the moment that the left hand tool is indenting an interval located at the extreme of such tool's left hand range of deflection to indent simultaneously the interval at the right hand or opposite end of the stitch following said interval, so that when the right hand one of the two intervals simultaneously indented, is fed to the left, the next following interval will be fed to a position within the range of the right hand tool. To provide for this operation I mount an auxiliary driver 123 on a stud 124 (Figs. 14 and 15). The forward extremity of the auxiliary driver lies normally to the right, outside of the range of the tools 1, and is provided with a spring 125 (see Fig. 15) which normally tends to throw it to the left or into a position over the right-hand tool. A latch or bolt 126, extending vertically upon the right hand side of the machine, as shown in Fig. 12, serves to hold the lever 123 in operative position, said latch being tripped when desired, by means of a locking rod 127 (see Fig. 13) mounted upon the comb 85 and connected by means of a bell crank lever 128 with an operating stud 129, which projects normally over and throughout a considerable extent of the slot 88 in the forward edge of the comb, which slot engages the stud 92 connected with the left hand tool 1, when the latter is deflected to its extreme left hand limit. A spring 130' thereafter, extending between rear end of stud 129 and lug 130. Fig. 13 maintains the locking rod, 127, normally in retracted position.

When the main driver 99 is in operative position over the left hand tool and when in such position of the parts the left hand tool is deflected to its extreme left hand limit, the slot 88 of the comb, 85, located beneath the operating stud 129, will engage the stud 92 of said left hand tool when the comb is moved forward, whereby the stud 129 will be pressed back and the latch 126 will be tripped and consequently the auxiliary driver 123 will be permitted to move to operative position over the right hand tool 1. Immediately thereafter, upon the return or rearward stroke of the comb 85, the cam disk 98 will be rotated one step and thus bring the lowest cam face 102 opposite the stud 101. Under these conditions and in the embodiment originally described the main driver 99 would swing to the left and operate idly over the space at the left of the left hand tool. In order to provide against this contingency and to maintain the driver 99 in operative position over the left hand tool, I provide a lever 131 (Fig. 12) pivoted at 132 in any convenient position in the base of the machine and having attached to its rear or shorter arm a stud, 133, lying directly beneath the main driver 99, when the latter is acting upon the left hand tool 1. To the forward and longer arm of the lever is attached a finger 134, which, as shown in Fig. 14, extends upwardly to the left of driver 99 when the latter is in the position above mentioned. By means of this construction the driver 99 during its first descent upon the left hand tool 1, depresses the stud 133 and through the lever 131, raises the finger 134, so that although the cam face 102 of the cam disk 98 is moved to position opposite the stud 101, said finger 134 will nevertheless prevent the driver 99 from swinging further to the left or to idle position and will maintain said driver in position over the left hand tool, while the simultaneous operation of the main and auxiliary drivers takes place. Said finger 134 may be maintained either in raised or depressed position by any suitable means, as, for instance, a suitable spring stud. During the forward stroke of the comb or feeler 85, while the drivers 99 and 123 are simultaneously depressed, the notch 88, beneath the stud 129, again engages the stud 89 of the left hand tool, whereby the lever 97 and consequently the pawl 106, is given a full stroke to rotate the cam disk 98. The movement of the cam disk upon this stroke, however, must be sufficient to carry the inclined face 100 past the stud 101 and bring the face 103 into alinement with the stud whereby the driver 99 may be shifted from its position over the left hand tool to operating position over right hand tool. In order to provide for this augmented movement of the cam disk 98, and referring to Fig. 20, a third pawl 135 is pivoted on the same pivot as the pawl 106 upon the arm 107, and a third set of ratchet teeth 136 is provided outside the ratchet teeth 104 to be engaged by said pawl 135. This set of ratchet teeth 136, however, instead of being continuous, is broken or mutilated so as to provide one tooth corresponding in position to every fourth tooth of the ratchet 104, and the arm 107 is so connected by the link 109 with the lever 97 as to give the pawls 104 and 135 a movement equal to three teeth of the ratchet 104. The pawl 106, however, is provided with a rearward cam extension 137, which engages with a pin 138 in the frame of the machine, so that said pawl 106 is permitted to engage with the ratchet 104 only during the last third of its movement, hence this pawl only moves the cam disk one step for each swing of the arm 107. The auxiliary pawl 135, however, is permitted to engage the ratchet 136 throughout the entire stroke of the arm 107, so that when said pawl 135 engages one of the teeth of the ratchet 136, as it will do upon every fourth stroke of the arm 107, the cam disk 98 will be given a movement equal to three ordinary movements; whereby the cam disk will move sufficiently to carry the inclined face 100, which is equal in extent to three ordinary cam spaces, past the stud 101 and bring the face 103 into alinement with said stud; whereby the driver 99 will be shifted from its position over the left hand tool to operating position over the right hand tool. It is understood that the normally operating pawl 106 is so mounted as to have a movement equal to but one step of the cam disk, as in the embodiment of the device first described.

After the simultaneous stroke of the main driver 99 and the auxiliary driver 112 has taken place, it is necessary when the main driver 99 is shifted to the right or to position over the right hand tool, that the auxiliary driver 123 be moved back to its inoperative position until again required. To this end the main driver is provided with a laterally projecting stud 137 (see Figs. 15 and 17) of a length equal to the space between the levers when simultaneously operated, whereby said stud not only serves as a stop to the swing of the auxiliary driver 123 into operative position, but also to move said driver to the right and into engagement with its holding latch 126. In order to depress the auxiliary driver 123 simultaneously with the main driver, the former is provided with a depending hook 138 (Fig. 17) which when said driver is in operative position, engages beneath the hook portion 139 of a spring stud 140 mounted in the base of the machine and which lies beneath the main driver when the latter is in operative position over the left hand tool. The descent of the driver 99 under these conditions, depresses the stud 140 and consequently draws down with it the auxiliary lever 123 to perform the indenting operation; said lever 123 may be moved to operative position in any desired manner, as by a spring 125, see Fig. 15. Thus it will be obvious that by changing the direction of rotation of the cam disk 98, the main driver 99 may be caused to operate the indenting tools successively from left to right or right to left.

During the normal operation of the machine or successive operation of the tools from left to right, it is necessary when the main driver is to be shifted beyond the left hand tool to its idle position, that the stop finger 134, Figs. 11, 12, and 14, above referred to, be removed from its path. To this end I provide a short transverse lever, 141, Figs. 14 and 19, pivoted at its center in the base of the machine and having one end projecting beneath the short arm of the lever 131 and having attached at its opposite end an upwardly projecting stud 142, which is located in the path of driver 99 when the latter is operating upon the right hand tool. Consequently, upon the first stroke of the driver in the latter position, the stud 142 will be depressed, whereupon the opposite end of the lever 141, will serve to elevate the short arm of the lever 131 and thereby depress the finger 134.

During normal operation of the machine, while the cam disk is being rotated in the direction of the arrow, see Fig. 24, movement of the cam face 103 past the stud 101, will serve to bring said stud into engagement with the inclined face 100, whereupon pressure of the spring 143 which normally tends to throw the said driver to the left upon the main driver 99, will cause the stud of itself to further rotate the cam disk until the lowest cam face 102 is opposite said stud.

At the starting of the machine it is desirable that the indenting operation shall be begun by the center tool, so that in case of isolated error or cumulative error occurring either to right or left of the center tool, it will be possible for the right or left tool readily to come into operation when required. To this end the cam disk 98 (Figs. 26 and 27) may be provided with a star wheel 144, the apices of which between the points are so arranged relatively to the cam ring upon the inner face of the disk that said apices may be engaged by the beveled shoulder 145' of a rod 145, to bring the necessary cam face opposite the stud 101 to shift the driver 99 into operative position over the center tool. This rod 145 may be actuated in any suitable manner, as from the main starting treadle, and may be normally held out of engagement of the star wheel and clear of its path by a suitably arranged depressing spring not shown.

In order to enable the rod 45 to shift the cam disk, irrespective of which of the pawls 106, 110 or 135 may be engaged therewith, it is necessary to provide some means for raising both of the pawls in order to insure their disengagement from the disk. To this end, shifting links 111 and 112 may be provided with slots at their upper ends to engage the pivots upon the rock arms 113 and 114, and upon suitably arranged collars on these links may be located a yoke 148, adapted to be operated by an upward extension 149 of the rod 145. The yoke 148 is slotted to receive the links 111 and 112 in order to permit of the necessary horizontal swing of the said links during the operative movements of the pawls to which they are connected.

In case it is desired to hold the outside tools deflected at their upper extremities, in order to permit of freer deflecting movement of the center tool when the latter is operated, a stationary yoke 150 (see Fig. 28) mounted upon the standard 151 extending upwardly from a convenient portion of the machine frame may be provided having beveled faces 152 which lie in the path of the outer tools 1 and extending somewhat below their uppermost position whereby said tools will be held away from the center tool when they are at rest in such uppermost position.

Other changes may be made in construction and relative arrangement of parts of my invention without departing from the spirit and scope thereof.

Claim.

1. In a stitch separating and indenting machine, the combination of a plurality of separating and indenting tools each capable of lateral movement with means for operating said tools singly.

2. In a stitch separating and indenting machine, the combination of a plurality of separating and indenting tools with means controlled by the stitch error for shifting the operation from one to another of said tools.

3. In a stitch separating and indenting machine, the combination of a plurality of separating and indenting tools with operating means controlled by said tools to determine the particular tool to be operated.

4. In a stitch separating and indenting machine, the combination of a plurality of separating and indenting tools and operating means therefor, with stitch controlled selecting means to determine which of said tools shall be operated.

5. In a stitch separating and indenting machine, the combination of a plurality of tools for separating and indenting stitches with means controlled by said tools to select the tool to be operated.

6. In a stitch separating and indenting machine, the combination of a plurality of deflectable separating and indenting tools operable in adjacent paths, with operating means therefor controlled by the deflection of an operated tool to select a tool to be operated.

7. In a stitch separating and indenting machine, the combination of a plurality of separating and indenting tools with means controlled by the relative positions of the work and tools, for selecting the tools to be operated.

8. In a stitch separating and indenting machine, the combination of stitch separating and indenting means with operating means therefor controlled by the relative position of the work and said separating and indenting means, to determine the manner of operation of the latter.

9. In a stitch separating and indenting machine, the combination with separating and indenting means with selecting means therefor, and means controlled by said selecting means to operate said separating and indenting means.

10. In a stitch separating machine, the combination of a plurality of successively operable indenting tools with common actuating means for selectively operating any one of said tools.

11. In a stitch separating machine, a plurality of tools each deflectable upon descending contact with a stitch flank and means to selectively operate said tools in desired order.

12. In a stitch separating and indenting machine the combination of a plurality of stitch separating and indenting tools operable in different sequence with means to actuate said tools.

13. In a stitch separating machine the combination of a plurality of stitch separating tools operable in sequence, with means to vary said sequence.

14. In a stitch separating machine the combination of a plurality of separating tools with means for temporarily suspending the indenting operation during the operation of the machine.

15. In a stitch separating machine the combination of a plurality of separating tools with means to operate said tools singly or a plurality simultaneously.

16. In a stitch separating and indenting machine, the combination of a plurality of separating and indenting tools and means to operate said tools in sequence with means to reverse the sequence of operation.

17. In a stitch separating machine the combination of a uniform feed device, a plurality of operable indenting tools, and means for selectively operating any one of said indenting tools and permitting the others of said tools to remain inoperative.

18. In a stitch separating and indenting machine the combination of indenting tools 1, a driver 10 to operate any one of said tools, and means for selectively determining which of said tools shall be operated by the driver.

In testimony whereof, I have signed my name to this specification, in the presence of two subscribing witnesses.

HENRY H. CUMMINGS.

Witnesses:
RALPH C. POWELL,
EDITH E. CHAPMAN.